(12) United States Patent
Barton et al.

(10) Patent No.: US 8,401,399 B2
(45) Date of Patent: Mar. 19, 2013

(54) CHIP-BASED ADVANCED MODULATION FORMAT TRANSMITTER

(75) Inventors: Jonathon Barton, Santa Barbara, CA (US); Leif Johansson, Goleta, CA (US); Milan Mashanovitch, Santa Barbara, CA (US)

(73) Assignee: Freedom Photonics, LLC., Santa Barbara, CA (US)

( * ) Notice: Subject to any disclaimer, the term of this patent is extended or adjusted under 35 U.S.C. 154(b) by 326 days.

(21) Appl. No.: 12/789,350

(22) Filed: May 27, 2010

(65) Prior Publication Data

US 2010/0303469 A1     Dec. 2, 2010

Related U.S. Application Data

(60) Provisional application No. 61/182,017, filed on May 28, 2009, provisional application No. 61/182,022, filed on May 28, 2009.

(51) Int. Cl.
*H04B 10/04* (2006.01)
*H04J 14/02* (2006.01)

(52) U.S. Cl. ........... 398/200; 398/87; 398/184; 398/201

(58) Field of Classification Search ........... 398/81, 398/82, 86, 87, 183, 184, 200, 201
See application file for complete search history.

(56) References Cited

U.S. PATENT DOCUMENTS

| | | |
|---|---|---|
| 3,752,992 A | 8/1973 | Fluhr et al. |
| 3,939,341 A | 2/1976 | Graves et al. |
| 3,970,838 A | 7/1976 | Goodwin et al. |
| 3,984,835 A | 10/1976 | Kaplan et al. |
| 4,063,084 A | 12/1977 | Goodwin et al. |
| 4,168,397 A | 9/1979 | Bradley |
| 4,596,052 A | 6/1986 | Wright et al. |
| 4,622,672 A | 11/1986 | Coldren et al. |
| 4,870,654 A | 9/1989 | Cantoni et al. |
| 4,893,352 A | 1/1990 | Welford |
| 4,896,325 A | 1/1990 | Coldren |
| 4,903,341 A | 2/1990 | Rice |
| 4,903,342 A | 2/1990 | Yamazaki |
| 4,904,963 A | 2/1990 | Heidel |
| 5,003,625 A | 3/1991 | Khoe |
| 5,007,106 A | 4/1991 | Kahn et al. |
| 5,008,957 A | 4/1991 | Kiyono |
| 5,088,105 A | 2/1992 | Scifres et al. |
| 5,101,450 A | 3/1992 | Olshansky |

(Continued)

FOREIGN PATENT DOCUMENTS

| | | |
|---|---|---|
| WO | WO 95/22070 | 8/1995 |
| WO | WO 03/079508 | 9/2003 |

(Continued)

OTHER PUBLICATIONS

Corzine, S. et al., "10-Channel x 40Gb/s per channel DQPSK Monolithically Integrated InP-based Transmitter PIC," in National Fiber Optic Engineers Conference, OSA Technical Digest (CD) (Optical Society of America, 2008), paper PDP18, Feb. 2008.

(Continued)

*Primary Examiner* — Dalzid Singh

(74) *Attorney, Agent, or Firm* — Knobbe Martens Olson & Bear LLP

(57) ABSTRACT

In various embodiments, a monolithic integrated transmitter, comprising an on-chip laser source and a modulator structure capable of generating advanced modulation format signals based on amplitude and phase modulation are described.

21 Claims, 9 Drawing Sheets

U.S. PATENT DOCUMENTS

| | | | |
|---|---|---|---|
| 5,126,557 | A | 6/1992 | Khoe et al. |
| 5,170,274 | A | 12/1992 | Kuwata et al. |
| 5,181,136 | A | 1/1993 | Kavehrad et al. |
| 5,222,103 | A | 6/1993 | Gross |
| 5,237,292 | A | 8/1993 | Chethik |
| 5,323,258 | A | 6/1994 | Tsushima et al. |
| 5,359,449 | A | 10/1994 | Nishimoto et al. |
| 5,424,863 | A | 6/1995 | Gertel |
| 5,452,118 | A | 9/1995 | Maruska |
| 6,020,963 | A | 2/2000 | DiMarzio |
| 6,078,412 | A | 6/2000 | Fuse et al. |
| 6,205,159 | B1 | 3/2001 | Sesko et al. |
| 6,271,950 | B1 | 8/2001 | Hansen et al. |
| 6,407,843 | B1 | 6/2002 | Rowan et al. |
| 6,459,521 | B1 | 10/2002 | Bakker et al. |
| 6,584,136 | B2 | 6/2003 | Ju et al. |
| 6,661,975 | B1 | 12/2003 | Hall et al. |
| 6,704,375 | B1 | 3/2004 | Serbe |
| 6,781,741 | B2 | 8/2004 | Uesaka |
| 6,782,205 | B2 * | 8/2004 | Trisnadi et al. ............... 398/94 |
| 6,807,321 | B2 * | 10/2004 | Madsen ....................... 385/11 |
| 7,023,601 | B2 | 4/2006 | McGhan et al. |
| 7,027,476 | B2 | 4/2006 | Taghavi-Larigani et al. |
| 7,035,486 | B2 | 4/2006 | Griffin et al. |
| 7,078,981 | B2 | 7/2006 | Farag |
| 7,103,239 | B2 | 9/2006 | Kish |
| 7,116,460 | B2 | 10/2006 | Griffin |
| 7,200,296 | B2 | 4/2007 | Kish |
| 7,209,664 | B1 | 4/2007 | McNicol et al. |
| 7,212,326 | B2 | 5/2007 | Wooten et |
| 7,245,788 | B2 | 7/2007 | Fujita et al. |
| 7,272,271 | B2 | 9/2007 | Kaplan et al. |
| 7,366,362 | B2 | 4/2008 | Tanimura |
| 7,457,496 | B2 | 11/2008 | Joyner |
| 7,460,793 | B2 | 12/2008 | Taylor |
| 7,466,882 | B2 | 12/2008 | Kish |
| 7,633,988 | B2 | 12/2009 | Fish |
| 7,751,658 | B2 | 7/2010 | Welch |
| 7,885,492 | B2 | 2/2011 | Welch |
| 2005/0123017 | A1 | 6/2005 | Huang et al. |
| 2005/0163186 | A1 | 7/2005 | Petersen |
| 2005/0213618 | A1 | 9/2005 | Sochava et al. |
| 2006/0193362 | A1 | 8/2006 | Kopf et al. |
| 2007/0122161 | A1 | 5/2007 | Charlet et al. |
| 2007/0133918 | A1 | 6/2007 | Cho et al. |
| 2007/0177882 | A1 | 8/2007 | Akiyama |
| 2007/0230617 | A1 | 10/2007 | Tao et al. |
| 2008/0056727 | A1 | 3/2008 | Nishihara et al. |
| 2008/0080872 | A1 | 4/2008 | Tanaka et al. |
| 2009/0245795 | A1 | 10/2009 | Joyner |
| 2009/0245796 | A1 * | 10/2009 | Little et al. ....................... 398/79 |
| 2010/0303476 | A1 | 12/2010 | Barton et al. |

FOREIGN PATENT DOCUMENTS

| | | |
|---|---|---|
| WO | WO 2008/036313 | 3/2008 |

OTHER PUBLICATIONS

Cho, P., et al., "Coherent Homodyne Detection of BPSK Signals Using Time-Gated Amplification and LiNbO$_3$ Optical 90° Hybrid," IEEE Photonics Technology Letter, vol. 16, No. 7, pp. 1727-1729, Jul. 2004.

Cho, P., et al., "Investigation of 2-b/s/Hz 40 Gb/s DWDM Transmission Over 4x100 km SMF-28 Fiber Using RZ-DQPSK and Polarization Multiplexing," IEEE Photonics Technology Letter, vol. 16, No. 2, pp. 656-658, Feb. 2004.

Cho, P., et al., "Transmission of 25-Gb/s RZ-DQPSK Signals with 25-GHz Channel Spacing Over 1000 km of SMF-28 Fiber," IEEE Photonics Technology Letter, vol. 15, No. 3, pp. 473-475, Mar. 2003.

Zhu, B., et al., "High Spectral Density Long-Haul 40-Gb/s Transmission Using CSRZ-DPSK Format," Journal of Lightwave Technology, vol. 22, No. 1, pp. 208-214, Jan. 2004.

Griffin, R.A., et al., "Integrated DQPSK Transmitter for Dispersion-Tolerant and Dispersion-Managed DWDM Transmission," in Optical Fiber Communications Conference, (Optical Society of America, 2003), paper FP6, Mar. 2003.

Cobb, K.W. et al., "Reduction of optical phase noise in semiconductor lasers," Electronics Letters, vol. 18, Issue 8, pp. 336-337, Apr. 15 1982.

Glance, B., "Performance of AFC for phase noise reduction of optical sources," Electronics Letters, vol. 21, Issue 21, pp. 994-996, Oct. 10, 1985.

Kikuchi, K. et al., "Design theory of electrically frequency-controlled narrow-linewidth semiconductor lasers for coherent optical communication systems," Journal of Lightwave Technology, vol. 5, Issue 9, pp. 1273-1276, Sep. 1987.

Langley et al., "Packaged semiconductor laser optical phase-locked loop (OPLL) for photonic generation, processing and transmission of microwave signals," IEEE Transactions on Microwave Theory and Techniques, Vo. 47, pp. 1257-1264, Jul. 1999.

Camatel, S. et al., "Optical phase-locked loop for coherent detection optical receiver," Electronics Letters, vol. 40, No. 6, pp. 384-38518 Mar. 2004.

Ferrero, V. et al., "A novel optical phase locked loop architecture based on sub-carrier modulation", in Optical Fiber Communication Conference, Technical Digest (CD) (Optical Society of America, 2004), paper FN6, Feb. 2004.

Tsukamoto, S. et al., "Coherent demodulation of optical multilevel phase-shift-keying signals using homodyne detection and digital signal processing", IEEE Photonics Technology Letters, vol. 18, No. 10, pp. 1131-1133, May 2006.

Noe, R. "Phase noise-tolerant synchronous QPSK/BPSK baseband-type intradyne receiver concept with feedforward carrier recovery," Journal of Lightwave technology, vol. 23, No. 2, pp. 802-808, Feb. 2005.

Griffin, R.A, et. al. "Integrated Devices for Advanced Modulation Formats," 2004 IEEE/LEOS Workshop on Advanced Modulation Formats, pp. 39-40, Jul. 1-2, 2004

Kato, M. et. al., "Transmitter PIC for 10-Channel x 40Gb/s per Channel Polarization Multiplexed RZ-DQPSK Modulation," in Optical Fiber Communication Conference, OSA Technical Digest (CD) (Optical Society of America, 2009), paper OThN2, Mar. 2009.

Seimetz M. "Performance of Coherent Optical Square-16-QAM-Systems based on IQ-Transmitters and Homodyne Receivers with Digital Phase Estimation," in Optical Fiber Communication Conference and Exposition and The National Fiber Optic Engineers Conference, Technical Digest (CD) (Optical Society of America, 2006), paper NWA4, Mar. 2006.

Seimetz M. "Multi-Format Transmitters for Coherent Optical M-PSK and M-QAM Transmission," Transparent Optical Networks, 2005, Proceedings of 2005 7th International Conference, vol. 2, pp. 225-229, Jul. 2005.

Doerr, C.R., et. al., "Monolithic InP 16-QAM Modulator," in Optical Fiber Communication Conference and Exposition and the National Fiber Optic Engineers Conference, OSA Technical Digest (CD) (Optical Society of America, 2008), paper PDP20, Feb. 2008.

Doerr, C.R., et. al., "Compact High-Speed InP DQPSK Modulator," IEEE, Photonics Technology Letters, vol. 19, No. 15, pp. 1184-1186, Aug. 2007.

Shin, M. et al., "A novel BPSK Method using Multiple Quantum Well Electro-Absorption Modulator Integrated with MMI couplers," International Topical Meeting on Microwave photonics, MWP'99 Digest, pp. 149-152, Nov. 1999.

Griffin, R.A, et. al., "Optical Differential Quadrature Phase-Shift Key (oDQPSK) for High Capacity Optical Transmission, " in Optical Fiber Communications Conference, vol. 70 of OSA Trends in Optics and Photonics (Optical Society of America, 2002), paper WX6, Mar. 2002.

Di, L. et. al., "Single-Facet Folded-Cavity Diode Laser With Ultrasmall Bend Radius High-Index-Contrast Oxidized AlGaAs Ridge Waveguide," IEEE Photonics Technology Letters, vol. 19, No. 8, pp. 598-600, Apr. 2007.

Wang, S. et al., "Analysis of ring distributed feedback lasers," Journal of Applied Physics, vol. 45, No. 9, pp. 3978-3980, Sep. 1974.

Wesstrom, J.O, et. al.,"Design of a Widely Tunable Modulated Grating Y-branch Laser using the Additive Vernier Effect for Improved Super-mode Selection," Semiconductor Laser Conference, 2002, pp. 99-100.

* cited by examiner

CHIP-BASED ADVANCED MODULATION FORMAT TRANSMITTER

CROSS-REFERENCE TO RELATED APPLICATIONS

This application claims the benefit under 35 U.S.C. §119(e) of U.S. Provisional Application 61/182,017 filed on May 28, 2009 titled "Chip-Based Advanced Modulation Format Transmitter," which is hereby expressly incorporated herein by reference in its entirety.

This application also claims the benefit under 35 U.S.C. §119(e) of U.S. Provisional Application 61/182,022 filed on May 28, 2009 titled "Monolithic Widely-Tunable Coherent Receiver," which is hereby expressly incorporated herein by reference in its entirety.

BACKGROUND

1. Field of the Invention

Various embodiments of the invention relate to the area of optical communications photonic integrated circuits (PICs). In particular, various embodiments relate to integrated optical transmitters capable of generating multilevel optical modulation formats in optical communications applications.

2. Description of the Related Art

As demand for higher capacity in optical networks continues to grow, ways to increase optical network capacity with reduced capital investment are of interest. One cost efficient solution that allows for increased or maximum utilization of the existing optical network infrastructure is to implement more spectrally efficient modulation formats for increased data throughput capacity. Advanced modulation formats such as Quadrature Amplitude Modulation (QAM), Phase Shift Keying (PSK), and Quadrature Phase Shift Keying (QPSK) are spectrally efficient and can improve the efficiency of fiber Wavelength Division Multiplexing (WDM). Modulation formats such as Quadrature Phase Shift Keying and Quadrature Amplitude Modulation can allow for a number of data symbols to be sent utilizing the same line rate as a lower bit-rate On-Off keyed system. Present optical transmitters for generating optical signals having advanced modulation formats are large-scale monolithic photonic integrated circuits (PICs) or use hybrid platforms. Due to their size, large-scale PICs may require low waveguide losses, high performance optical sources and other optical subcomponents. Moreover, refined fabrication processes and techniques may be required to reduce defects and to improve yield of large-scale PICs. Thus, there is a need for optical transmitters having a reduced footprint and a tolerance for optical waveguide losses that can be fabricated with simple integration platforms.

SUMMARY

Systems and methods that enable an optical transmitter capable of generating optical signals with advanced modulation formats may be beneficial in optical networks and systems. Example embodiments described herein have several features, no single one of which is indispensible or solely responsible for their desirable attributes. Without limiting the scope of the claims, some of the advantageous features will now be summarized.

Various embodiments described herein include a compact optical transmitter having a reduced die size. For example, the die size of the various embodiments of the optical transmitter device described herein can be between approximately 0.5 square mm and approximately 3 square mm. In various embodiments, the die size of the optical transmitter device can be between approximately 1.5 square mm and approximately 2.5 square mm. In various embodiments, the die comprises a monolithically integrated optical transmitter device that is included in packaging to form the device. In various embodiments, the die can comprise a monolithically integrated optical transmitter device that will be coupled to optical fibers or RF/electrical connectors. The decrease in the footprint and/or the die size of the optical transmitter device can advantageously reduce fabrication complexity required to integrate a single surface-ridge waveguide structure and improve yield. Various embodiments of the optical transmitter described herein can comprise a tunable laser resonator and an optical vector modulator. In various embodiments, an optical vector modulator can include a modulator arrangement capable of modulating both optical intensity and optical phase to generate optical vector modulation. Examples of optical vector modulation formats include QPSK modulation and multilevel QAM modulation. An arrangement for passive modulator bias control can be implemented in various embodiments of the optical transmitter to adjust for the wavelength dependence of the modulator.

In various embodiments described herein, an optical transmitter comprising a widely tunable laser and one or more optical vector modulators may be monolithically integrated on a single die having a common substrate. In various embodiments, monolithic common substrate integration can include processes and techniques that place all the subcomponents of the device on a common substrate through semiconductor device processing techniques (e.g. deposition, epitaxial growth, wafer bonding, wafer fusion, etc). In some embodiments, the optical transmitter comprising a widely tunable laser and one or more optical vector modulators may be integrated on a single die having a common substrate, through other techniques such as flip-chip bonding, etc. Monolithic common substrate integration can provide a reduction in device insertion losses. Such tunable optical transmitter devices can allow for a reduction in the number of components and devices required in an optical system. Other advantages of an integrated tunable optical transmitter can be compact die size, reduced footprint, faster tuning mechanisms, and the lack of moving parts—which can be desirable for applications subject to shock, vibration or temperature variation. Integrating an optical transmitter on a single die can offer several other advantages as well, such as precise phase control, improved performance and stability of the transmitter, and compact implementation. Some additional benefits of integrating a tunable laser with an optical modulator on a single die can be: the ability to adjust or optimize the device performance; ability to control and optimize the bias of the modulators for every single wavelength—(the wavelength information is known for an integrated transmitter, but not known when a discrete modulator is used); and ability to utilize feedback from on-chip integrated tap signals in order to better control the operating point of the chip.

Various embodiments, described herein include a complex optical transmitter fabricated on a small die size. Such devices can be fabricated using relatively simple fabrication techniques and/or integration platforms. In various embodiments described herein, optical interconnect losses can be reduced by reducing interconnect length rather than by including complex low-loss optical waveguide structures.

Various embodiments of the optical transmitter described herein comprise a common substrate comprising a III-V material such as Indium Phosphide and one or more epitaxial layers (InP, InGaAs, InGaAsP, InAlGaAs etc.); a laser resonator, formed on the common substrate in the epitaxial structure; and one or more modulator structures comprising a plurality of arms or branches and at least two electrodes formed on the common substrate. The one or more modulator structures may be configured to modulate the amplitude, the phase, or both amplitude and phase of optical radiation emitted from the laser resonator. In various embodiments, the modulator structures may modulate light in accordance with the principles of optical interference. In some embodiments, the modulator structures may be positioned external to the laser cavity and be optically connected to the laser resonator. In various embodiments, the various components of the optical transmitter such as waveguides, photonic components, splitters, etc. can be formed in the same epitaxial structure as the epitaxial structure in which the laser is formed. In some embodiments the components of the optical transmitter such as waveguides, photonic components, splitters, etc. can be formed in one or more epitaxial structures that are different from the epitaxial structure in which the laser is formed.

In various embodiments a monolithically integrated optical transmitter die is described. In various embodiments, the size of the monolithically integrated optical transmitter die can be less than approximately 3 square mm. The monolithically integrated optical transmitter die comprises at least one monocrystalline substrate. The monolithically integrated optical transmitter die further comprises a tunable laser resonator monolithically integrated with the substrate, the tunable laser resonator comprising an output reflector and a tuning section, said tunable laser resonator configured to emit optical radiation from the output reflector along an optical axis, such that the wavelength of the emitted optical radiation is tunable over a wide wavelength range from between about 15 nm to about 100 nm, wherein the wide wavelength range is represented by $\Delta\lambda/\lambda$ and is configured to be greater than a ratio $\Delta n/n$, wherein $\lambda$, represents the wavelength of the optical radiation, $\Delta\lambda$ represents the change in the wavelength of the optical radiation, n represents the refractive index of the tuning section, and $\Delta n$ represents the change in the refractive index of the tuning section. The monolithically integrated optical transmitter die further comprises a first optical vector modulator monolithically integrated with the substrate, the first optical modulator comprising a first optical splitter optically connected to the laser resonator, a plurality of arms comprising at least two electrodes and a first output coupler; and a second optical vector modulator monolithically integrated with the substrate, said second optical modulator comprising a second optical splitter optically connected to the laser resonator, a plurality of arms comprising at least two electrodes and a second output coupler. The monolithically integrated optical transmitter die further comprises a polarization rotator monolithically integrated with substrate, said polarization rotator arranged at an angle between about 20 deg and 160 deg or between about −20 deg and −160 deg with respect to the optical axis; and an optical combiner monolithically integrated with the substrate and configured to combine optical signals output from the first and second optical couplers. In various embodiments, the first and/or the second optical splitters can be disposed at a distance of approximately less than 750 μm from the output reflector of the laser resonator as measured along the optical axis.

In various embodiments, a method of manufacturing a monolithically integrated optical transmitter is described. The method comprises providing at least one monocrystalline substrate. The method further includes monolithically integrating a tunable laser resonator with the substrate, the tunable laser resonator comprising an output reflector and a tuning section, said tunable laser resonator configured to emit optical radiation from the output reflector along an optical axis, such that the wavelength of the emitted optical radiation is tunable over a wide wavelength range from between about 15 nm to about 100 nm, wherein the wide wavelength range is represented by $\Delta\lambda/\lambda$ and is configured to be greater than a ratio $\Delta n/n$, wherein $\lambda$, represents the wavelength of the optical radiation, $\Delta\lambda$ represents the change in the wavelength of the optical radiation, n represents the refractive index of the tuning section, and $\Delta n$ represents the change in the refractive index of the tuning section. The method further includes monolithically integrating a first optical vector modulator with the substrate, said first optical modulator comprising a first optical splitter optically connected to the laser resonator, a plurality of arms comprising at least two electrodes and a first output coupler. The method can further include monolithically integrating a second optical vector modulator with the substrate, said second optical modulator comprising a second optical splitter optically connected to the laser resonator, a plurality of arms comprising at least two electrodes and a second output coupler. The method also comprises monolithically integrating a polarization rotator with substrate, said polarization rotator arranged at an angle between about 20 deg and 160 deg or between about −20 deg and −160 deg with respect to the optical axis; and monolithically integrating an optical combiner with the substrate, said optical combiner configured to combine optical signals output from the first and second output couplers. In various embodiments, the first and/or the second optical splitters can be disposed at a distance of approximately less than 750 μm from the output reflector of the laser resonator as measured along the optical axis. In various embodiments, the monolithically integrated optical transmitter can have a die size less than 3 square mm.

Figure 1:
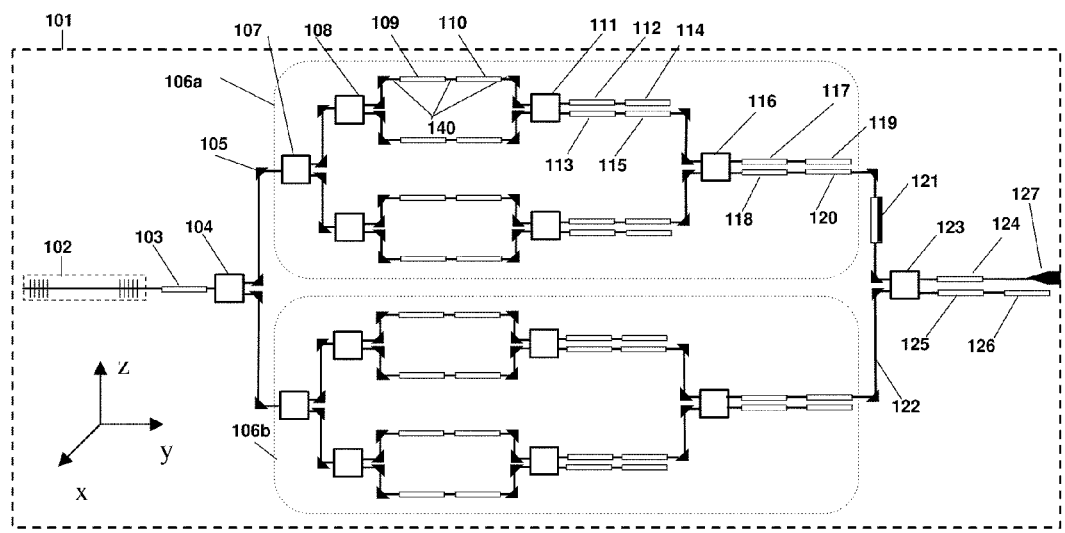
FIG. 1 schematically illustrates an embodiment of an optical transmitter having a reduced footprint and including a laser resonator and a pair of optical vector modulators.

These and other features will now be described with reference to the drawings summarized above. The drawings and the associated descriptions are provided to illustrate embodiments and not to limit the scope of the disclosure or claims. Throughout the drawings, reference numbers may be reused to indicate correspondence between referenced elements. In addition, where applicable, the first one or two digits of a reference numeral for an element can frequently indicate the figure number in which the element first appears.

DETAILED DESCRIPTION OF THE PREFERRED EMBODIMENT

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied using a variety of techniques including techniques that may not be described herein but are known to a person having ordinary skill in the art. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. It will be understood that when an element or component is referred to herein as being "connected" or "coupled" to another element, it can be directly connected or coupled to the other element or intervening elements may be present therebetween.

FIG. 1 schematically illustrates an embodiment of an optical transmitter device. The device comprises at least one monocrystalline substrate 101, a laser resonator 102, one or more optical vector modulators 106a and 106b, a polarization rotator 121 and an optical coupler 123. In various embodiments, the various sub-components of the optical transmitter may be monolithically integrated with the substrate 101. The optical vector modulators 106a may include an optical splitter 107 connected to the laser resonator 102, a plurality of arms comprising at least two modulation electrodes and an optical coupler 116. The optical vector modulator 106b may be similar structurally similar to optical vector modulator 106a. These and other features are further described below.

Monocrystalline Substrate

In various embodiments, the monocrystalline substrate 101 may comprise one or more epitaxial structures. In various embodiments, an epitaxial structure may be formed by depositing a monocrystalline film on a monocrystalline substrate. In various embodiments, epitaxial films may be grown from gaseous or liquid precursors. Because the substrate acts as a seed crystal, the deposited film takes on a lattice structure and orientation identical to those of the substrate. In various embodiments, the epitaxial structure comprises InGaAsP/InGaAs or InAlGaAs layers on either a GaAs or InP substrate grown with techniques such as MOCVD or Molecular Beam Epitaxy (MBE) or with wafer fusion of an active III-V material to a silicon-on-insulator (SOI) material.

Laser Resonator

As discussed above in various embodiments, the laser resonator 102 may be formed on the common substrate and/or in one or more epitaxial structures formed on the common substrate. In various embodiments, the one or more epitaxial structures can include layers or stacks of layers grown, deposited or formed on the common substrate such that the one or more layers have a lattice structure and orientation substantially similar to the common substrate. In various embodiments, the laser resonator 102 can include a widely tunable laser. In various embodiments, the widely tunable laser can comprise a lasing cavity disposed between two mirrors or reflectors and a tuning section. The optical radiation or laser light generated by the widely tunable laser is output from the reflector disposed closer to the output side of the laser cavity (output reflector) along an optical axis. In various embodiments of the optical transmitter device the optical axis can be aligned parallel to the crystallographic axis of the monocrystalline substrate 101 (e.g. 011 axis for an InP substrate). In the embodiment illustrated in FIG. 1, the optical axis can be aligned parallel to the +y axis.

In various embodiments, the wavelength of the optical radiation emitted from the widely tunable laser can be tuned over a wide wavelength range from between about 15 nm to about 100 nm. Without subscribing to any particular theory, in various embodiments, the widely tunable laser can have a relative wavelength change ($\Delta\lambda/\lambda$) that is larger than the available relative index tuning ($\Delta n/n$) inside the laser cavity, wherein $\lambda$, represents the wavelength of the optical radiation, $\Delta\lambda$ represents the change in the wavelength of the optical radiation, n represents the refractive index of the tuning section, and $\Delta n$ represents the change in the refractive index of the tuning section. The widely tunable laser oscillator can be configured to tune to any transmission wavelength in a given range, wherein the range may be larger than the range that can be achieved by refractive index tuning of the semiconductor material and/or the tuning section alone. Without subscribing to any particular theory, the wide wavelength tuning in some embodiments of the widely tunable laser can be achieved by using the Vernier effect, in which the two mirrors or reflectors defining the lasing cavity have multiple reflection peaks. The lasing wavelength is then defined by the overlap between one reflection peak of each mirror. Tuning the index in one of the mirrors or the tuning section (e.g. by applying a voltage to electrodes disposed on the mirrors and/or the tuning section) can shift the wavelength of each of the many reflections, causing a different pair of reflection peaks to come into alignment, thus shifting the lasing wavelength further than that of the wavelength shift of the tuned mirror.

In various embodiments, the widely tunable laser as described herein can have a tuning range from about 15 nm to about 100 nm around 1550 nm. In some embodiments, the laser resonator 102 can have a tuning range that is greater than approximately 15 nm. In certain embodiments, the tuning range may be approximately 40 nm to 100 nm. In some embodiments, the tuning range may be approximately 20 nm, approximately 25 nm, approximately 30 nm, approximately 35 nm, approximately 40 nm, approximately 45 nm, approximately 50 nm, approximately 55 nm, approximately 60 nm, approximately 65 nm, approximately 70 nm, approximately 75 nm, approximately 80 nm, approximately 85 nm, approximately 90 nm, or approximately 95 nm. In certain embodiments, the tuning range may have a value between any of the values provided above. In some embodiments, the tuning range may be less than approximately 15 nm or greater than approximately 100 nm.

In various embodiments, the laser resonator 102 can include any of a variety of widely tunable lasers such as, for example, Sampled Grating Distributed Bragg Reflector (SGDBR) lasers, Superstructure grating Distributed Bragg reflector, Digital Supermode Distributed Bragg Reflector (DSDBR), Y-branch or folded tunable laser, etc.

In some embodiments, an optical amplifier section 103 can be integrated at an output side of the tunable laser 102. The optical amplifier section 103 can amplify the optical radiation emitted from the laser resonator 102 and in some embodiments, the optical amplifier section 103 may be used to control the power generated laser light.

Optical Splitters and Fan-Outs

In various embodiments, the optical radiation from the laser resonator 102 can be split into two parts using an optical splitter 104. In various embodiments, the optical splitter 104 can include without limitation a multimode interference (MMI) splitter. In various embodiments, the optical splitter 104 can comprise at least one input waveguide and at least two output waveguides configured such that optical radiation propagating through the at least one input waveguide is split between the at least two output waveguides. In general, integrating a tunable laser with one or more vector modulators on the same die may require mitigation of light reflection. To this effect, in various embodiments, optical splitters and optical couplers can comprise N inputs and M outputs that can allow for light evacuation from the vector optical modulators (e.g. by absorption in the substrate) when they are in their unbiased or OFF state. In various embodiments, the number of inputs N can be 2, 4, etc. while the number of outputs M can be 2, 3, etc. In various embodiments, the splitter 104 can split the light either equally or unequally between the at least two output waveguides. In some embodiments, the optical power splitting ratio between the at least two output waveguide can be tunable.

In various embodiments, a rapid transverse fan-out of the optical radiation propagating through the at least two output waveguides of the splitter 104 can be achieved through the use of a plurality of total internal reflection (TIR) mirrors 105, each TIR mirror can be configured to the change the direction of propagation of the optical radiation, for example, by about 90 degrees. In some embodiments, S-bends or other optical waveguide structures may be used to achieve transverse fan-out of the optical radiation propagating through the at least two output waveguides of the splitter 104.

In various embodiments, the (TIR) mirrors can also be integrally formed on the substrate 101. In various embodiments, a TIR mirror can comprise a high index-contrast dielectric—semiconductor interface that allows discrete reflection of the optical mode between two waveguides. One purpose of these structures can be to change the direction of propagation of the optical radiation. In some embodiments, the TIR mirror can comprise at least one reflective facet arranged at an angle θ with respect to the waveguide that is configured to change the direction of propagation of the optical radiation by approximately 90 degrees. Consecutive reflection by two TIR mirrors can allow a 180 degree change in propagation direction of the optical radiation. TIR mirrors can also allow a rapid transversal displacement of the optical radiation, that can be advantageous to achieve a compact fan-out of input or fan-in of output optical waveguides from the optical splitters and optical couplers in contrast to the more commonly used S-bends which require a gradual fan-out to maintain low optical loss. In various embodiments, the use of TIR mirrors can enable a reduction in the die size or the footprint of the device since the input and output waveguides can be fanned-out or fanned-in to achieve the desired separation between the various sub-components in relatively less space. Furthermore, the lengths of optical waveguides can be shortened in devices using TIR mirrors so as to reduce optical propagation losses. Various embodiments, comprising S-bends to fan-out or fan-in the input and output waveguides would likely result in an increase in the die size or the footprint of the device, since the lengths of the waveguides with S-bends and/or the radius of curvature of the S-bends cannot be reduced beyond a certain minimum length (e.g. in various embodiments, S-bends can exhibit increased loss if the radius of curvature is less than 50 microns) without increasing waveguide losses or complicating the integration platform. Use of TIR mirrors is thus advantageous to realize complex devices having reduced die size and footprint by using a simple integration platform. Nevertheless, there may be embodiments in which S-bends or other waveguide structures may be more preferable than TIR mirrors to achieve fan-out of input or fan-in of output optical waveguides from the optical splitters and optical couplers.

Optical Vector Modulators

Each of the two fanned-out optical signals from the splitter 104 are input to separate optical vector modulators 106a and 106b. Without subscribing to any particular theory, a vector optical modulator can include an optical modulator capable of modulating both optical intensity and optical phase of an input optical radiation to generate optical vector modulation. Examples of optical vector modulation formats include but are not limited to QPSK modulation and multilevel QAM modulation.

In various embodiments, each of the optical vector modulators 106a and 106b may comprise a multi branch structure comprising multiple waveguides. In some embodiments, the optical vector modulators 106a and 106b may include nested Mach-Zehnder modulator (MZM). In various embodiments, the optical vector modulators can be configured to have low optical transmission in their unbiased or OFF state (i.e. when no bias voltages are applied). In some embodiments, this could be accomplished by varying the width, the length, and/or the optical path length of the waveguides associated with the optical vector modulators or other methods of refractive index variation between the branches of the optical vector modulators.

Bias Control of Optical Vector Modulators

The operation of an optical vector modulator with a widely tunable laser can place an increased burden on modulator bias control. In simple optical modulator configurations (e.g. simple on-off keying (OOK) modulators) bias control can be provided by simple arrangements. For example, for electro-absorption modulators (EAM) or Mach-Zehnder type modulators (MZM) configured to generate a modulated optical signal having a simple modulation format (e.g. OOK) bias adjustment can be made, either directly to the modulator bias electrode (e.g. in an EAM), or via an external modulator phase tuning pad (e.g. in a MZM). The bias adjustment can be conveniently calibrated with wavelength of the optical input to the modulator. In contrast, in optical vector modulators configured to generate optical signals with complex modulation formats, there can be a multitude of modulator bias controls. For example, in a dual polarization nested MZM modulator for QPSK generation, there can be up to a total of 15 phase control electrodes that may need to be adjusted based on the wavelength of the input optical radiation. Various active bias control schemes have been demonstrated, however, these can be impractical for a large number of control points. Further, active bias control schemes can lead to a small distortion of the generated optical waveform.

An option for bias control in optical vector modulators may be to implement passive bias control that can be combined with wavelength calibration to achieve the required modulator stability. For example, in optical vector modulators arranged in a Mach-Zehnder type configuration and implemented by using MMI splitters/couplers, the output MMI coupler can include output ports that may not be utilized to form the output modulated optical signal. By integrating a photo detector in the un-utilized port and partial absorbers in all the ports of the MMI coupler, the optical power in all the ports of the MMI coupler can be monitored. The output of the photo detector and the partial absorbers can provide information regarding the phase and power in various branches of the MZ structure. In some embodiments, the partial absorber can be a contacted passive waveguide section. Most III-V waveguide compositions can exhibit partial absorption at 0V applied voltage. By measuring the resulting photocurrent, a relative estimate for the optical power in the optical waveguide can be obtained. From the information obtained from the partial absorbers in combination with the absolute optical power measurement in unused MMI output port photo detector, optical power in all MMI output ports can be estimated at any operating wavelength. This information may then be used to provide modulator bias control. For example, in some embodiments, a feedback circuit configured to provide an input electrical signal based on the information obtained from the partial absorbers and/or the photo detector in the unused MMI port to one or more electrodes (e.g. the bias control electrode) of the optical vector modulators.

Operation of Optical Vector Modulators

In the embodiment illustrated in FIG. 1, the input optical signal to the optical vector modulator 106a is further split into two parts by an optical splitter 107. In various embodiments, the optical splitter 107 may be similar to the optical splitter 104 described above. In various embodiments, the optical splitter 107 can be disposed at a distance of approximately 750 microns or less from the output reflector of the laser resonator 102 as measured along the optical axis of the laser resonator 102. In various embodiments, the optical splitter 107 can be disposed at a distance of approximately 750 microns or less from the output reflector of the laser resonator 102 as measured along a horizontal direction parallel to a first edge of the die (e.g. along the y-axis). In various embodiments, the optical splitter 107 can be disposed at a distance of approximately 150 microns—approximately 500 microns from the output reflector of the laser resonator 102 as measured along the vertical direction parallel to a second edge of the die (e.g. along the x-axis). In some embodiments, the optical splitter 107 can be disposed at a distance of approximately 250 microns or less from the output reflector of the laser resonator 102 as measured along the optical axis of the laser resonator 102. In yet other embodiments, the optical splitter 107 can be disposed at a distance of approximately 250 microns or less from the output interface of the amplifier section 103 as measured along the optical axis of the laser resonator 102.

Each of the two outputs from the splitter 107 is further split into two parts by another optical splitter. For example, in the embodiment illustrated in FIG. 1 the optical splitter 108 further splits one of the outputs of the splitter 107. The two output signals from the splitter 108 are fanned-out using TIR mirrors, S-bends or other waveguide structures. Each of the fanned-out output from splitter 108 is input to a waveguide (e.g. 140 of FIG. 1) that includes a first electrode (e.g. 109 of FIG. 1). An electrical signal can be provided to the first electrode 109 to modulate the optical radiation propagating through the waveguide 140. In various embodiments, the electrical signal provided to the electrode 109 may have a bandwidth in the range of approximately 5 GHz to approximately 50 GHz. In various embodiments, a second electrode 110 can be disposed on the waveguide 140. Electric current may be provided to the second electrode 110 to adjust the phase of the optical radiation propagating through the waveguide 140. In various embodiments, the electrical current provided to the electrode 110 may have a value between about 0 mA and about 15 mA.

An optical coupler 111 (e.g. multimode interference (MMI) coupler, evanescent coupled-mode coupler, reflection coupler, or Y-branch coupler) unites the two optical waveguides that are disposed at the output of the splitter 108 to form one MZM in the dual nested MZM structure. In various embodiments, the optical coupler 111 can include at least two input waveguides and at least one output waveguide. The optical coupler 111 can be configured to combine optical radiation from the at least two input waveguides either equally or unequally and couple the combined radiation to the at least one output waveguide. In the embodiment illustrated in FIG. 1, the optical coupler 111 includes a first and a second output waveguide. In various embodiments, a modulator monitoring arrangement may be formed by a partial absorber 112 disposed on the first output waveguide and a partial absorber 113 disposed on the second output waveguide. In various embodiments, an optical termination detector (e.g. a photo detector) 114 may be provided to the first output waveguide of coupler 111 to absorb radiation propagating in the first output waveguide.

In various embodiments, the partial absorber 113 in second output waveguide is followed by an electrode 115. Electric current may be provided using a current driver to the electrode 115 such that the optical phase of the optical signal propagating in the second output waveguide may be controlled by controlling the amount of current provided to the electrode 115. In various embodiments, the electrical current provided to the electrode 115 may have a value between about 0 mA and 15 mA. The optical signal propagating in the second output waveguide of coupler 111 is combined with the output from the second MZM in the dual nested MZM structure of optical vector modulator 106a in a coupler (e.g. a 2×2 MMI coupler) 116 having at least 2 input waveguides and at least one output waveguide. In various embodiments, the coupler 116 can couple the combined optical signal into two output waveguides that can further include two partial absorbers 117 and 118, a termination photo detector 119 and an electrode 120 to which current can be provided to control the optical phase.

In various embodiments, the output optical signal from the optical vector modulator 106a is reflected using a TIR mirror, and coupled to an integrated polarization rotator 121 that is configured to rotate the polarization of the optical signal by approximately 90 degrees. In some embodiments, the polarization rotator 121 may be configured to rotate the polarization of the optical signal by less than or greater than 90 degrees. In various embodiments, the polarization rotator 121 may be disposed at an angle θ between about 20 degrees and 160 degrees or between about −20 degrees and −160 degrees with respect to the optical axis of the laser resonator. In various embodiments, the polarization rotator 121 may be disposed at an angle θ between about 20 degrees and 160 degrees or between about −20 degrees and −160 degrees with respect to the crystallographic axis of the monocrystalline substrate. The output optical signal from the polarization rotator 121 is then recombined with the output from the second optical vector modulator 106b which is propagated in the optical waveguide 122 in the optical coupler (e.g. multimode interference (MMI) coupler, evanescent coupled-mode coupler, reflection coupler, or Y-branch coupler) 123. In various embodiments, the features of the optical vector modulator 106b can be structurally and functionally similar to the features of the optical vector modulator 106a described above. In various embodiments, the output of the second optical vector modulator 106*b* can be configured to maintain its original input polarization. Two partial absorbers 124, 125 can be located at the output of the coupler 123 to provide additional signal monitoring. In some embodiments, one of the output waveguides of the coupler 123 can be terminated in a photo detector (126) while signal propagating in the other output waveguide of the coupler 123 can be coupled to an external environment through an output edge of the optical transmitter device. Facets may be provided at the output edge of the optical transmitter device to enable optical connection with optical fibers, planar waveguides, other devices and systems. In some embodiments, a mode converter 127 may be disposed closer to the output edge of the device to improve coupling efficiency.

Some Preferred Embodiments

Some preferred embodiments are described below. It is understood that these represent a few possible embodiments out of a range of combinations that have some similarities to the embodiment illustrated in FIG. 1 and the sub-components described therein.

Figure 2:
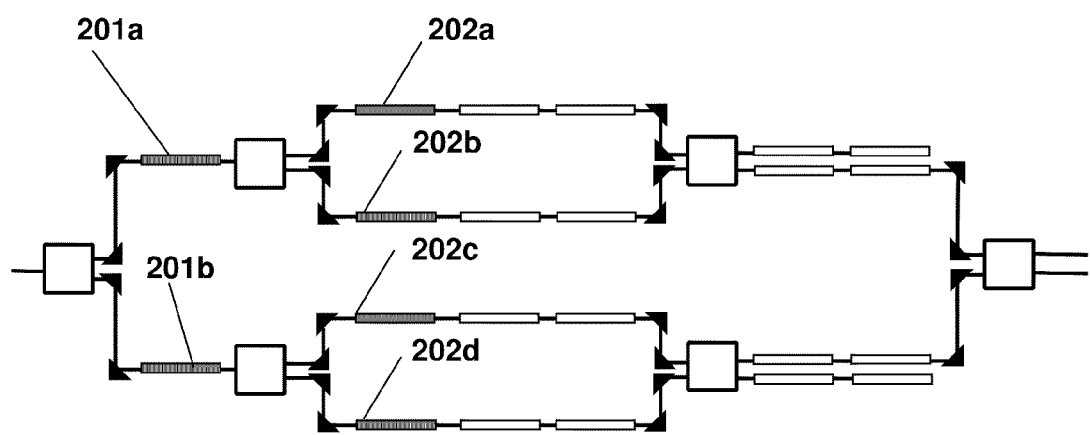
FIG. 2 schematically illustrates an embodiment of an optical vector modulator.

FIG. 2 schematic illustrates an embodiment of a single optical vector modulator similar to the optical vector modulator 106*a* and 106*b* of FIG. 1. The optical vector modulator illustrated in FIG. 2 can include optical gain regions 201*a* and 201*b* and/or 202*a* and 202*b* within the modulator structure. For example, in some embodiments, optical amplifier sections 201 can be provided after the first splitting stage (e.g. splitter 107 of FIG. 1). In certain embodiments, it may be advantageous to provide an amplifying section after the first splitting stage (e.g. splitter 107 of FIG. 1) instead of providing an amplifying section after the laser resonator (e.g. amplifying section or region 103 of FIG. 1), since the amplifying section 201 may be able to deliver twice the saturated output power to the modulator sections. In some embodiments, optical amplifying section or regions 202 may be provided after the second splitting stage (e.g. after the optical splitter 108 of FIG. 1). In some embodiments, if the amplifying regions or sections in different branches of the optical vector modulator are spaced too closely, the saturated output power may be reduced due to heating effects. To eliminate or reduce heating effects, it may be advantageous to rapidly fan-out the various branches of the optical vector modulator to laterally separate the various branches. In some embodiments, TIR mirrors can be used to reduce the footprint of a device having such an arrangement.

Figure 3:
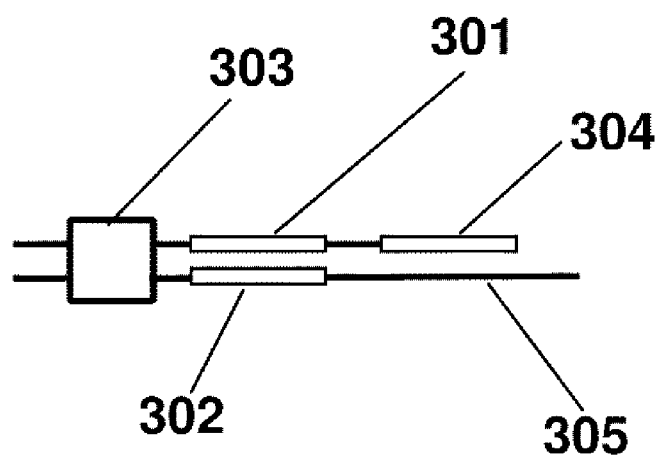
FIG. 3 schematically illustrates an embodiment of an optical vector modulator bias control.

FIG. 3 schematically illustrates an embodiment of a modulator bias control system. The modulator bias control system illustrated in FIG. 3 comprises two partial absorbers 301 and 302 that are located at the output ports of coupler 303 which is disposed at the output of a Mach-Zehnder structure. In various embodiments the coupler 303 can be similar to the coupler 111 or 116 of FIG. 1. The partial absorbers 301 and 302 may be used to detect a photocurrent that is dependent on optical power of the signal propagating in the waveguide. The bias control system can further include an optical termination detector 304 that is configured to absorb the radiation propagating in one of the output ports or waveguides of the coupler 303. The fractional relation between the photocurrent of the partial absorber 301 and the detector 304 can then be related to the photocurrent of partial absorber 302 to determine the optical waveguide power in the other output port or waveguide 305.

Figure 4:
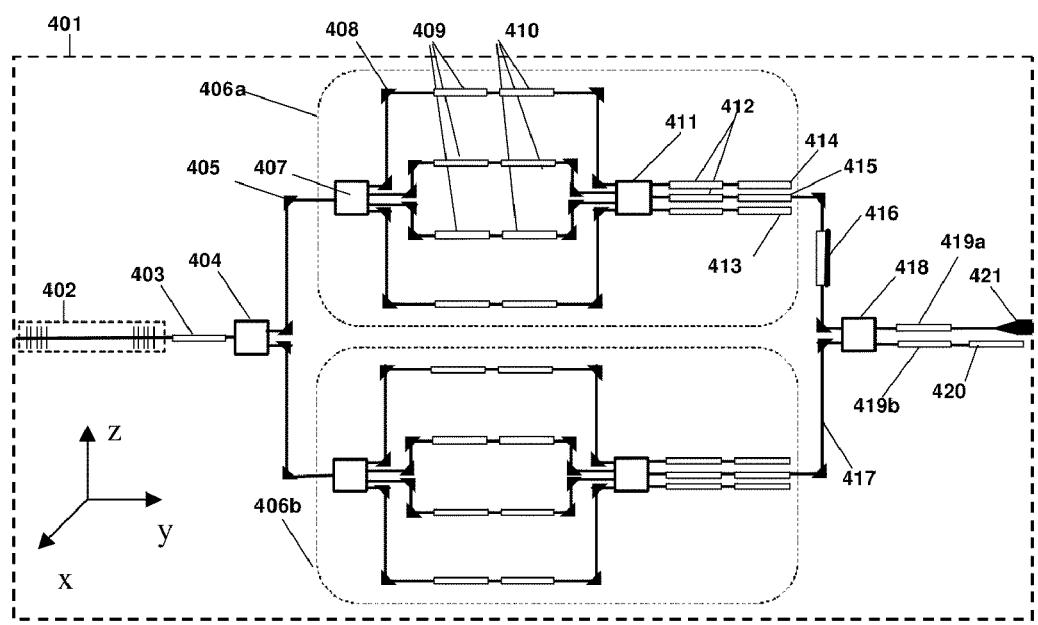
FIG. 4 schematically illustrates another embodiment of an optical transmitter having a reduced footprint and including a laser resonator and a pair of optical vector modulators.

FIG. 4 schematically illustrates a second embodiment of an optical transmitter device. Many of the features of the optical transmitter device illustrated in FIG. 4 can be similar to the features described with reference to FIG. 1. Similar to the embodiment shown in FIG. 1, the device illustrated in FIG. 4 can include a single epitaxial structure 401, a laser resonator 402, an optional optical amplifier section 403, an optical splitter 404 (e.g. a MMI splitter), a pair of optical vector modulators 406*a* and 406*b* and an optical coupler 418 (e.g. a MMI coupler). The optical splitter 404 and the MMI coupler 418 can be configured to split/combine optical radiation into either equal or unequal parts. In the illustrated embodiments, a rapid transverse fan-out of the radiation emitted from the two output ports or waveguides of the optical splitter 404 can be achieved through the use of multiple total internal reflection (TIR) mirrors (405), S-bends or other waveguide structures. In the embodiment illustrated in FIG. 4, the optical vector modulator 406*a* can include an input 1×4 splitter (e.g. 1×4 MMI splitter) 407. The four output signals from the 1×4 splitter 407 can be fanned out using TIR mirrors (408) and input into four optical waveguides. One or more of the four optical waveguides in the optical vector modulator 406*a* can include a first electrode (e.g. electrode 409) to which a modulation signal can be provided to generate an optically modulated signal. In various embodiments, the electrode 409 can be structurally and functional similar to the electrode 109 of FIG. 1. In various embodiments, the optical vector modulator 406*a* can further include a second electrode 410 in one or more of the four optical waveguides. An electric current can be provided to electrode 410 to adjust the phase of the optical signal propagating in the one or more output waveguides. In various embodiments, a 4×3 coupler 411 (e.g. a MMI coupler) can be provided to unite the optical signal propagating in the four optical waveguides of optical vector modulator 406*a* to obtain the modulated optical signal. A modulator monitoring arrangement as described above with reference to FIG. 1 can be provided herein as well. The modulator monitoring arrangement can be formed by partial absorber 412 located at the one or more of the output ports of the 4×3 coupler 411 and optical termination detectors 413 and 414 that absorb the light in the two unused output ports or waveguides of the 4×3 coupler 411. In various embodiments, the partial absorber 412 in second port or output waveguide of the 4×3 coupler 411 can be followed by an electrode 415 to which an electric current can be provided to adjust the phase of the optical signal propagating in the waveguide. The output of the optical vector modulator 406*a* can be reflected using a TIR mirror, S-bend or other waveguide structures, and coupled to an integrated polarization rotator 416 that rotates the polarization of the optical signal by approximately 90 degrees. The polarization rotator 416 can be structurally and functionally similar to the polarization rotator 121 of FIG. 1. This polarization rotated optical signal can be then combined in a 2×2 coupler 418 (e.g. a MMI coupler) with the output from the second integrated optical vector modulator 406*b* that is propagated through the optical waveguide 417. In various embodiments, the optical signal propagating in the optical waveguide 417 can maintain its original input polarization. Two partial absorbers 419*a* and 419*b* can be located at the output of the coupler 418 to provide additional signal monitoring capability. In some embodiments, one of the output waveguides of the coupler 418 can be terminated in a photo detector 420, while signal propagating in the other output waveguide of the coupler 418 can be coupled to an external environment through an output edge of the optical transmitter device. Facets may be provided at the output edge of the optical transmitter device to enable optical connection with other devices and systems. In some embodiments, a mode converter 421 may be disposed closer to the output edge of the device to improve coupling efficiency.

Figure 5:
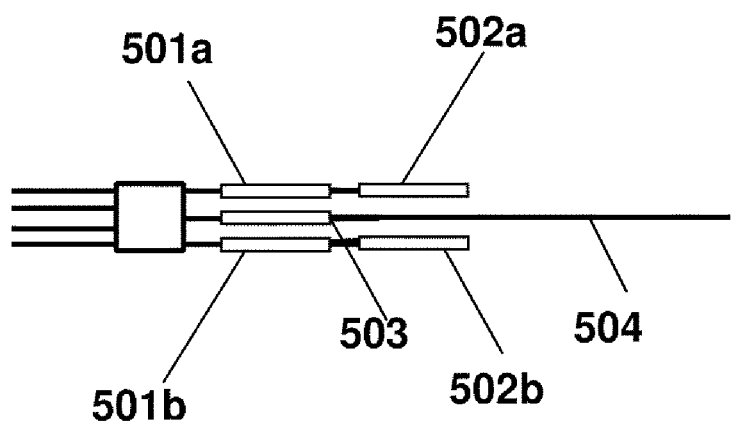
FIG. 5 schematically illustrates another embodiment of an optical vector modulator bias control.

FIG. 5 schematically illustrates an embodiment of a modulator bias control system that can be implemented with the optical vector modulator illustrated in FIG. 4. The modulator bias control illustrated in FIG. 5 can include partial absorber 501a, 501b, 503 and photo detectors 502a and 502b As described above with reference to FIG. 3, the output waveguide power can again be estimated by comparing the fractional relation of the photocurrent from the partial absorbers 501a and 501b and the detectors 502a and 502b which can then be related to the photocurrent of middle partial absorber 503 to determine the optical waveguide power in the output waveguide 504. Additional modulator bias information can be obtained by measuring the balance between the two detector currents.

Figure 6:
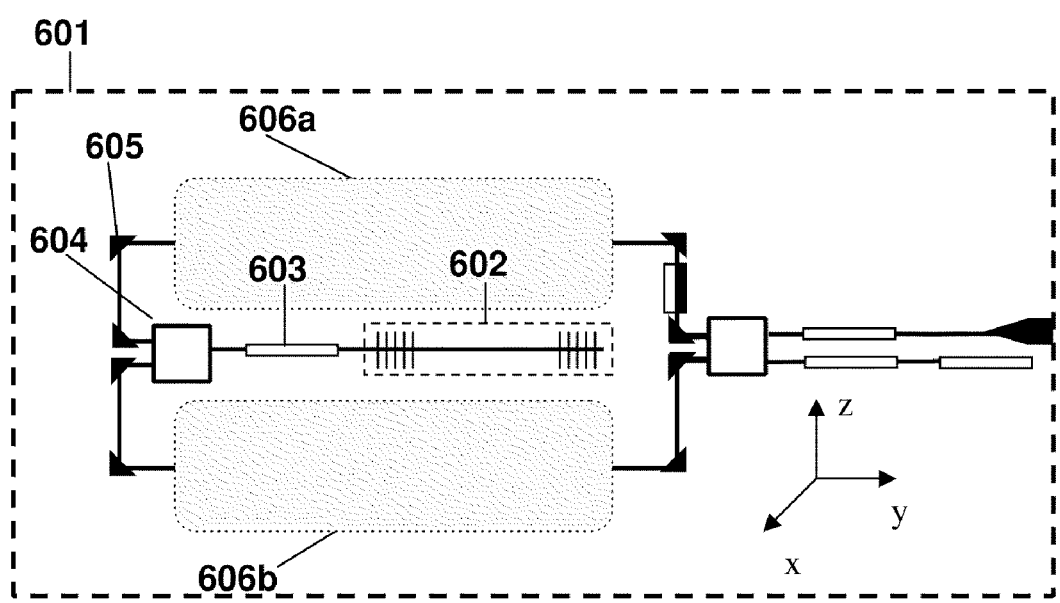
FIG. 6 schematically illustrates another embodiment of an optical transmitter having a reduced footprint and including a laser resonator and a pair of optical vector modulators.

FIG. 6 shows a variation of the embodiments illustrated in FIG. 1 or FIG. 4. The illustrated device can comprise a single epitaxial structure 601, a laser resonator 602, an optional optical amplifier section 603 and a splitter 604 (e.g. a multimode interference (MMI) splitter) splitting the light in two parts. As described above, TIR mirrors 605 can be used to rapidly fan out the two output waveguides or ports of the splitter 604. In the illustrated embodiment, the TIR mirrors are oriented such that the direction of propagation of the optical radiation emitted from the laser resonator 602 is turned by about 180 degrees before being input to the optical vector modulators 606a and 606b.

Figure 7:
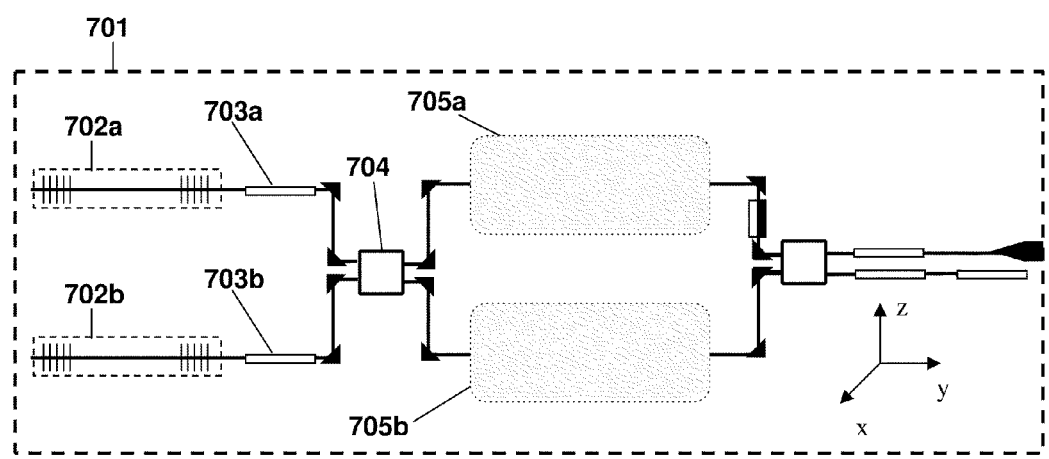
FIG. 7 schematically illustrates another embodiment of an optical transmitter having a reduced footprint and including two laser resonator and a pair of optical vector modulators.

FIG. 7 shows another variation of the embodiments illustrated in FIG. 1 or FIG. 4. The device illustrated in FIG. 7 comprises a single epitaxial structure 701, dual laser resonators 702a and 702b, optional dual optical amplifier sections 703a and 703b, and a 2×2 splitter 704 (e.g. a 2×2 multimode interference (MMI) splitter) for splitting the light in two parts. As described above, two optical vector modulators 705a and 705b can be monolithically integrated with the substrate to generate a modulated optical signal. Such a device may be advantageously used in optical switching applications, where a rapid transition from one optical wavelength to a second optical wavelength may be required. In various embodiments, the lasers 702a and 702b may be both tuned to their designated optical wavelengths, while the wavelength switching event takes place by turning one amplifier (e.g. 703a) on while turning the second amplifier (e.g. 703b) off, to switch which laser output light enters the 2×2 splitter 704.

In various embodiments, polarization beam splitters and rotators can be integrated on the common substrate in the same or different epitaxial structure as other sub-components of the integrated optical transmitter. In various embodiments, the polarization beam splitter elements may be formed on the common substrate, in the same or different epitaxial structure as other components, with the purpose of splitting the input coupled light into the TE and TM polarized modes of the common waveguide. One embodiment of this element can be realized by using the phenomenon of birefringence between two modes. A polarization rotating element can convert TM polarized light into TE polarized light and vice versa.

A polarization rotator can be formed by inducing a birefringence in the waveguide, for example, by fabricating an asymmetric waveguide. An asymmetric waveguide can be fabricated by etching the sidewall of the optical waveguide at an angle. By selecting the appropriate length of the angled etch, a halfwave plate can be formed that can rotate linearly polarized TE or TM light by 90 degrees. Other approaches and designs can also be used.

Figure 8A:
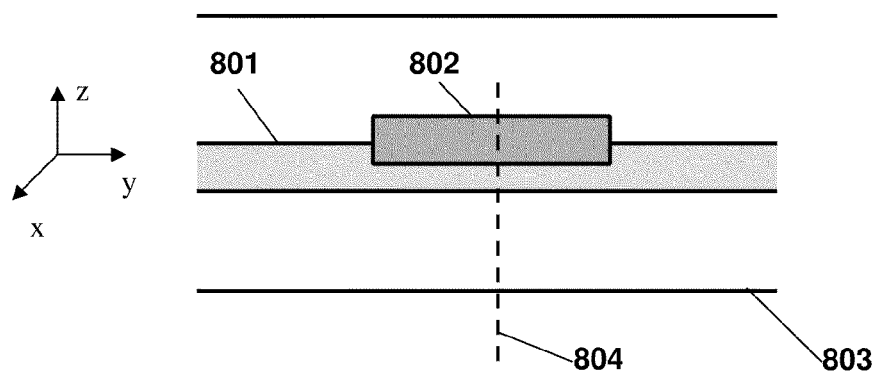
FIG. 8A schematically illustrates top view of an integrated of the polarization rotator.
Figure 8B:
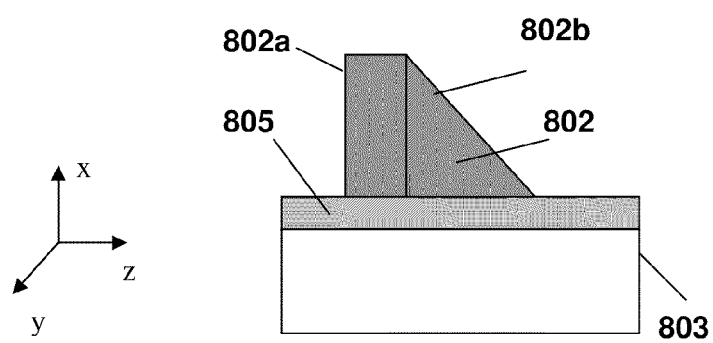
FIG. 8B schematically illustrates a cross-sectional view of an integrated of the polarization rotator.

FIG. 8A schematically illustrates top view of an embodiment of a polarization rotator that is integrated in the optical transmitter device. FIG. 8B schematically illustrates a cross-sectional view of the polarization rotator illustrated in FIG. 8A along an axis 804 parallel to the normal to the substrate 803 (e.g. parallel to the z-axis). In one embodiment, the polarization rotator comprises an asymmetric waveguide ridge 802 that is disposed on a substrate 803. In various embodiments, the polarization rotator can be formed by modifying a waveguide section 801 of the optical transmitter device using semiconductor device processing techniques. In various embodiments, the asymmetric waveguide ridge 802 can be formed on a slab waveguide 805 which comprises a high-index material. In some embodiments, the waveguide ridge 802 can have a first edge 802a disposed at a first angle with respect to the normal to the substrate and a second edge 802b disposed at a second angle with respect to the normal to the substrate. In various embodiments, the first and the second angle can be different from each other. In various embodiments, the first angle can be approximately parallel to the normal to the substrate as shown in FIG. 8B. The asymmetric nature of waveguide ridge 802 results in a bi-refringent waveguide structure.

The asymmetric waveguide structure 802 can be formed by using an etching process. For example, in one method of fabricating the polarization rotator, the asymmetric waveguide structure 802 is dry etched on one side of the waveguide ridge 802 to form the edge 802a, and wet etched on the other side of the waveguide ridge 802 to form the sloping edge 802b. In some embodiments, the method can include etching through the slab waveguide 805. Etching through the slab waveguide 805 can be advantageous to realize a polarization rotator structure with reduced footprint.

In one method of fabricating the polarization rotator on an InP substrate, the sloping edge 802b can be formed by employing a wet etch at a waveguide section oriented around 90 degrees with respect to the laser ridge—which gives around 40-50 degrees wet etch plane—that stops on the InGaAsP or InAlGaAs waveguide core (e.g. slab waveguide 805) or a stop etch layer. If a different orientation is chosen for the polarization rotator (e.g. perpendicular to or within 20-160 degrees or −20 to −160 degrees from the laser axis) the wet etch will align the waveguide edge to an angle not perpendicular to the substrate. The above described method of fabricating the polarization rotator can be a repeatable process and can yield polarization rotators with a small footprint.

Figure 8C:
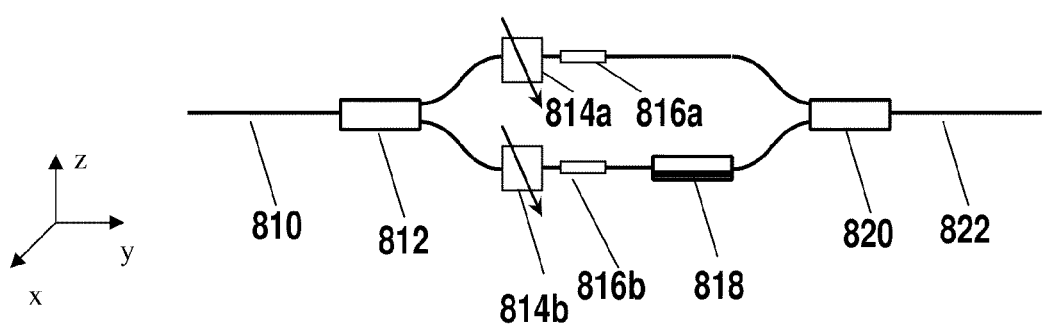
FIG. 8C schematically illustrates an embodiment of a tunable polarization rotator.

FIG. 8C illustrates an embodiment of a tunable polarization rotator. The tunable polarization rotator comprises an input waveguide 810 that is connected to an optical splitter 812 having with two output waveguides. In various embodiments, the optical splitter 812 can be a polarization beam splitter. Electrodes 814a, 814b, 816a and 816b may be provided to the two output waveguides. A voltage between approximately 1V to approximately −6V can be applied to the electrodes 814a and/or 814b to change the transmitted optical intensity. An electric current in the range of approximately, 0 mA to approximately 15 mA may be provided to the electrodes 816a and/or 816b to adjust the phase of the optical radiation propagating through the output waveguides. In various embodiments, the voltage and the current can be provided by using an external drive circuit. The tunable polarization rotator can further comprise a polarization rotator 818 that can be disposed in one of the output waveguides. The polarization rotator 818 can be similar to the various embodiments of the polarization rotators described above. The tunable polarization rotator can further comprise an optical coupler 820 having an output waveguide 822 and configured to combine the optical outputs of the two output waveguides of splitter 812. With the appropriate adjustment of optical phase and intensity, the polarization state of the signal in the output waveguide 822 can be tuned.

Figure 9:
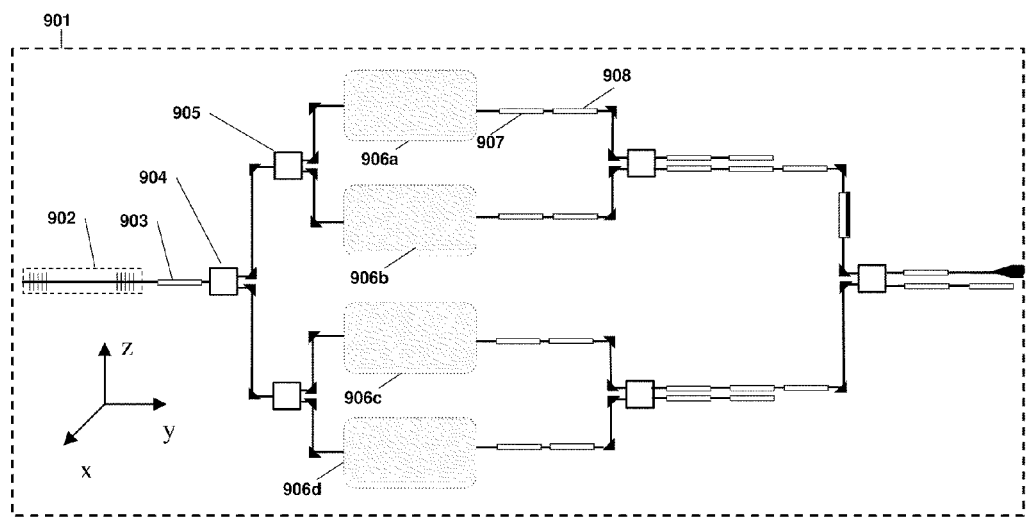
FIG. 9 schematically illustrates another embodiment of an optical transmitter.

FIG. 9 shows another embodiment of the optical transmitter device. The device illustrated in FIG. 9 can comprise at least one monocrystalline substrate having a single epitaxial structure 901, a laser resonator 902, an optional optical amplifier section 903, a 2×2 splitter 904 (e.g. a multimode interference (MMI) splitter) for splitting the light in two parts. In this embodiment, a second stage optical splitter 905 can be provided to further split the optical power. The illustrated embodiment may include four optical vector modulators 906a, 906b, 906c, 906d. The waveguide at the output of each optical vector modulator 906a, 906b, 906c, 906d can include a pair of electrodes 907 and 908. An electrical field can be provided to electrode 907 to control the amplitude of the optical signal in the output waveguide while an electrical current can be applied to electrode 908 to control the optical phase of the optical signal propagating in the output waveguide. By combining the output from two optical vector modulators with the correct phase and amplitude, more complex optical modulation formats such as 16-QAM modulation can be generated in a practical manner. This nested arrangement can be expanded for practical generation of even higher order modulation formats such as 64 or 128-QAM.

In various embodiments, the various integrated optical transmitter architectures and components can be monolithically integrated on a common substrate with the various integrated receiver architectures and components such as those described in U.S. Provisional App. No. 61/182,022 filed on May 28, 2009 titled "Monolithic Widely-Tunable Coherent Receiver," which is incorporated herein by reference in its entirety, to obtain a single transceiver device.

While the foregoing detailed description discloses several embodiments of the present invention, it should be understood that this disclosure is illustrative only and is not limiting of the present invention. It should be appreciated that the specific configurations and operations disclosed can differ from those described above, and that the apparatus and methods described herein can be used in contexts. Additionally, components can be added, removed, and/or rearranged. Additionally, processing steps may be added, removed, or reordered. A wide variety of designs and approaches are possible.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples.

What is claimed is:

1. A monolithically integrated optical transmitter die comprising:
   at least one monocrystalline substrate;
   a tunable laser resonator monolithically integrated with the substrate, said tunable laser resonator comprising an output reflector and a tuning section, said tunable laser resonator configured to emit optical radiation from the output reflector along an optical axis, such that the wavelength of the emitted optical radiation is tunable over a wide wavelength range from between about 15 nm to about 100 nm, wherein the wide wavelength range is represented by $\Delta\lambda/\lambda$ and is configured to be greater than a ratio $\Delta n/n$, wherein $\lambda$ represents the wavelength of the optical radiation, $\Delta\lambda$ represents the change in the wavelength of the optical radiation, n represents the refractive index of the tuning section, and $\Delta n$ represents the change in the refractive index of the tuning section;
   a first optical vector modulator monolithically integrated with the substrate, said first optical modulator comprising a first optical splitter optically connected to the laser resonator, a plurality of arms comprising at least two electrodes and a first output coupler;
   a second optical vector modulator monolithically integrated with the substrate, said second optical modulator comprising a second optical splitter optically connected to the laser resonator, a plurality of arms comprising at least two electrodes and a second output coupler;
   a polarization rotator monolithically integrated with the substrate, said polarization rotator arranged at an angle between about 20 deg and 160 deg or between about −20 deg and −160 deg with respect to the optical axis; and
   an optical combiner monolithically integrated with the substrate and configured to combine optical signals output from the first and second output couplers,
   wherein the first or the second optical splitters are disposed at a distance of approximately less than 750 μm from the output reflector of the laser resonator as measured along the optical axis,
   wherein the size of the monolithically integrated optical transmitter die is less than approximately 3 square mm.

2. The optical transmitter die of claim 1, wherein the substrate has an area less than approximately 2.5 square mm.

3. The optical transmitter die of claim 1, wherein the substrate has an area less than approximately 2 square mm.

4. The optical transmitter die of claim 1, wherein the substrate comprises Si, InP, InGaAsP, InGaP, GaAs or InGaAs.

5. The optical transmitter die of claim 1, wherein the substrate has a crystallographic axis, and wherein the optical axis of the laser resonator is aligned parallel to the crystallographic axis.

6. The optical transmitter die of claim 1, wherein at least one of the first and second optical vector modulators comprises a dual nested Mach-Zehnder modulator.

7. The optical transmitter die of claim 1, wherein each of the first and the second optical vector modulators comprises at least one electrode that is configured to provide one or more electrical signals, and wherein the first and the second optical vector modulators are configured to modulate the optical intensity and the optical phase of the emitted radiation from the laser in response to the one or more electrical signals and produce a modulated optical signal having a bandwidth of at least 5 GHz.

8. The optical transmitter die of claim 7, wherein each of the first and the second optical vector modulators comprises at least 4 electrodes that are configured to provide one or more electrical signals to the first and the second optical vector modulators.

9. The optical transmitter die of claim 7, further comprising one or more monitor electrodes configured to monitor power of the modulated optical signal propagating through the first or second output waveguides.

10. The optical transmitter die of claim 9, further comprising a feedback circuit configured to provide an input electrical signal to the at least one electrode of said first or second optical vector modulators based on an output of the one or more monitor electrodes.

11. The optical transmitter die of claim 7 configured to generate a QPSK modulated optical signal.

12. The optical transmitter die of claim 7 configured to generate a QAM modulated optical signal.

13. The optical transmitter die of claim 1, wherein the polarization rotator comprises an asymmetric waveguide structure.

14. The optical transmitter die of claim 1, further comprising a plurality of total internal reflecting (TIR) mirrors configured to couple the optical radiation from the laser resonator to the first and second optical vector modulators.

15. The optical transmitter die of claim 1, further comprising an amplifying section disposed between the laser resonator and the first and second optical vector modulators, said amplifying section comprising an output interface and configured to amplify the optical radiation emitted from the laser resonator.

16. The optical transmitter die of claim 15, wherein the first and the second optical splitters are disposed at a distance of approximately less than 250 μm from the output interface of the amplifying section as measured along the optical axis.

17. The optical transmitter die of claim 1, wherein the first and the second optical splitters are disposed at a distance of approximately less than 250 μm from the output reflector of the laser resonator as measured along the optical axis.

18. The optical transmitter die of claim 1, wherein the first and the second optical splitters are disposed at a distance of approximately less than 150 μm from the output reflector of the laser resonator as measured along the optical axis.

19. A method of manufacturing a monolithically integrated optical transmitter die, the method comprising:

providing at least one monocrystalline substrate;

monolithically integrating a tunable laser resonator with the substrate, said tunable laser resonator comprising an output reflector and a tuning section, said tunable laser resonator configured to emit optical radiation from the output reflector along an optical axis, such that the wavelength of the emitted optical radiation is tunable over a wide wavelength range from between about 15 nm to about 100 nm, wherein the wide wavelength range is represented by $\Delta\lambda/\lambda$ and is configured to be greater than a ratio $\Delta n/n$, wherein $\lambda$ represents the wavelength of the optical radiation, $\Delta\lambda$ represents the change in the wavelength of the optical radiation, n represents the refractive index of the tuning section, and $\Delta n$ represents the change in the refractive index of the tuning section;

monolithically integrating a first optical vector modulator with the substrate, said first optical modulator comprising a first optical splitter optically connected to the laser resonator, a plurality of arms comprising at least two electrodes and a first output coupler;

monolithically integrating a second optical vector modulator with the substrate, said second optical modulator comprising a second optical splitter optically connected to the laser resonator, a plurality of arms comprising at least two electrodes and a second output coupler;

monolithically integrating a polarization rotator with substrate, said polarization rotator arranged at an angle between about 20 deg and 160 deg or between about −20 deg and −160 deg with respect to the optical axis; and monolithically integrating an optical combiner with the substrate, said optical combiner configured to combine optical signals output from the first and second output couplers, wherein the first or the second optical splitters are disposed at a distance of approximately less than 750 μm from the output reflector of the laser resonator as measured along the optical axis, and wherein the size of the monolithically integrated optical transmitter die is less than 3 square mm.

20. The method of claim 19, wherein monolithically integrating a polarization rotator with the substrate comprises providing an asymmetric waveguide structure on the substrate.

21. The method of claim 19, wherein the monocrystalline substrate comprises Si, InP, InGaAsP, InGaP, GaAs or InGaAs.

* * * * *